United States Patent [19]

Janssen et al.

[11] Patent Number: 4,996,928
[45] Date of Patent: Mar. 5, 1991

[54] INTEGRATED CHASSIS AND SUSPENSION SYSTEMS FOR MONORAIL VEHICLES

[75] Inventors: Jan Janssen, Boucherville; André G. Fontaine, St-Hilaire, both of Canada

[73] Assignee: Bombardier Inc., Quebec, Canada

[21] Appl. No.: 406,243

[22] Filed: Sep. 12, 1989

[51] Int. Cl.⁵ .................. B61B 13/04; B61C 13/00
[52] U.S. Cl. .................. 105/144; 105/141; 104/119; 280/840; 280/DIG. 1
[58] Field of Search .......... 104/118, 119; 105/141, 105/144; 280/840, DIG. 1

[56] References Cited

U.S. PATENT DOCUMENTS

| | | | |
|---|---|---|---|
| 3,095,828 | 7/1963 | Deller | 105/144 |
| 3,899,979 | 8/1975 | Godsey, Jr. | 104/283 |
| 4,443,026 | 4/1984 | Harrison | 280/DIG. 1 X |
| 4,468,050 | 8/1984 | Woods et al. | 280/DIG. 1 |
| 4,648,621 | 3/1987 | Yokoya et al. | 280/840 X |

FOREIGN PATENT DOCUMENTS 1214262  4/1966  Fed. Rep. of Germany.

Primary Examiner—Robert P. Olszewski
Assistant Examiner—Alfred Muratori
Attorney, Agent, or Firm—Oblon, Spivak, McClelland, Maier & Neustadt

[57] ABSTRACT

A monorail vehicle support system for supporting a vehicle body along a monobeam rail having top and side running surfaces. An attachment frame is secured to opposed ends of the vehicle chassis. A single steerable load carrying wheel is supported in a vertical plane by the attachment frame for support engagement with the top running surface of the rail. A pair of side wheels, having pneumatic tires, are supported spaced-apart in parallel horizontal planes below the carrying wheel and on one side thereof for frictional engagement with one of the side running surfaces of the rail. A load arm secured at one end to an axle of the carrying wheel is provided with an air bag and a levelling system for maintaining the vehicle chassis at a substantially constant level with respect to the beam by compensating for vertical displacement of the pneumatic suspension element (airbag) caused by the load variations.

10 Claims, 3 Drawing Sheets

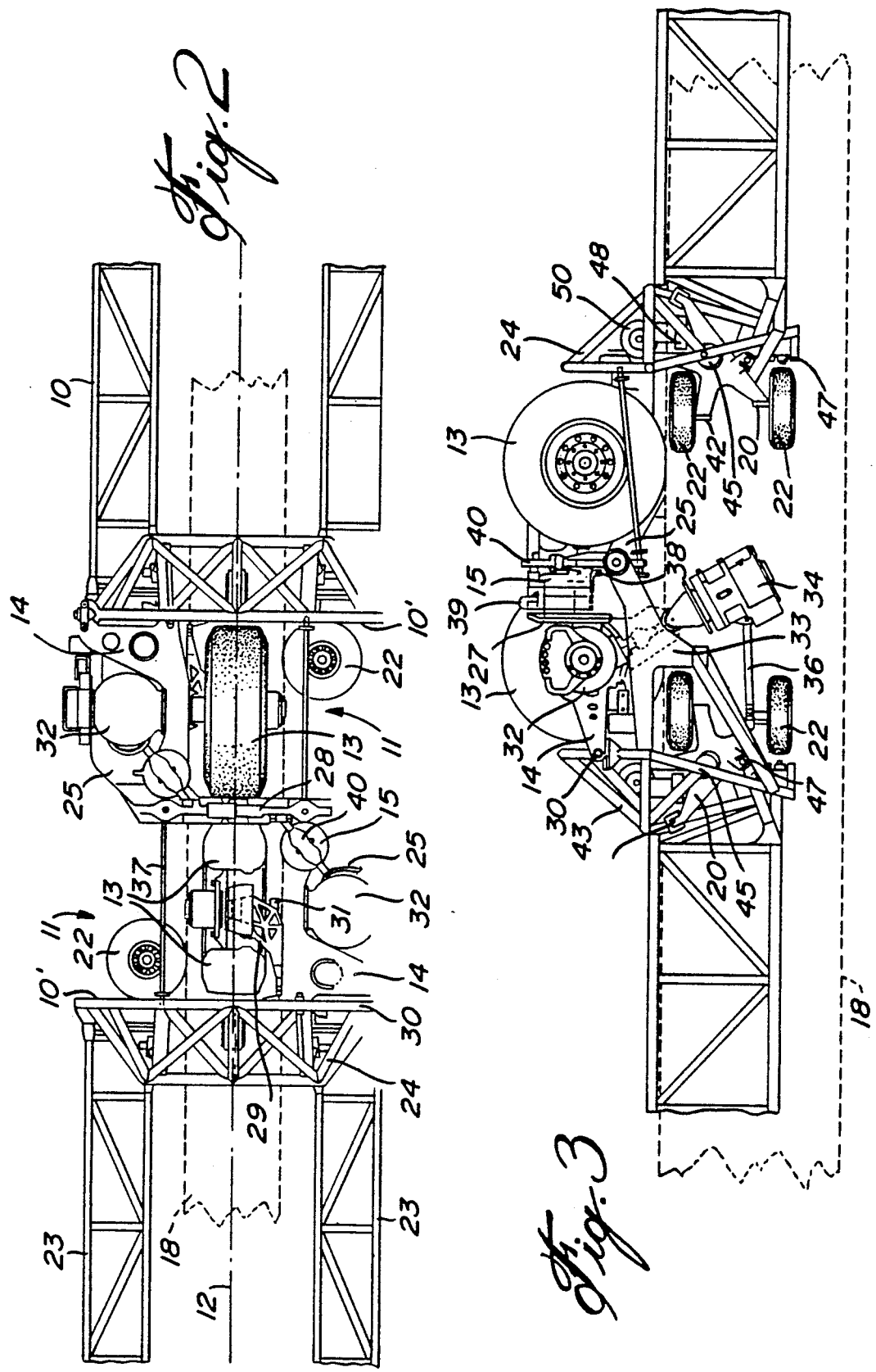

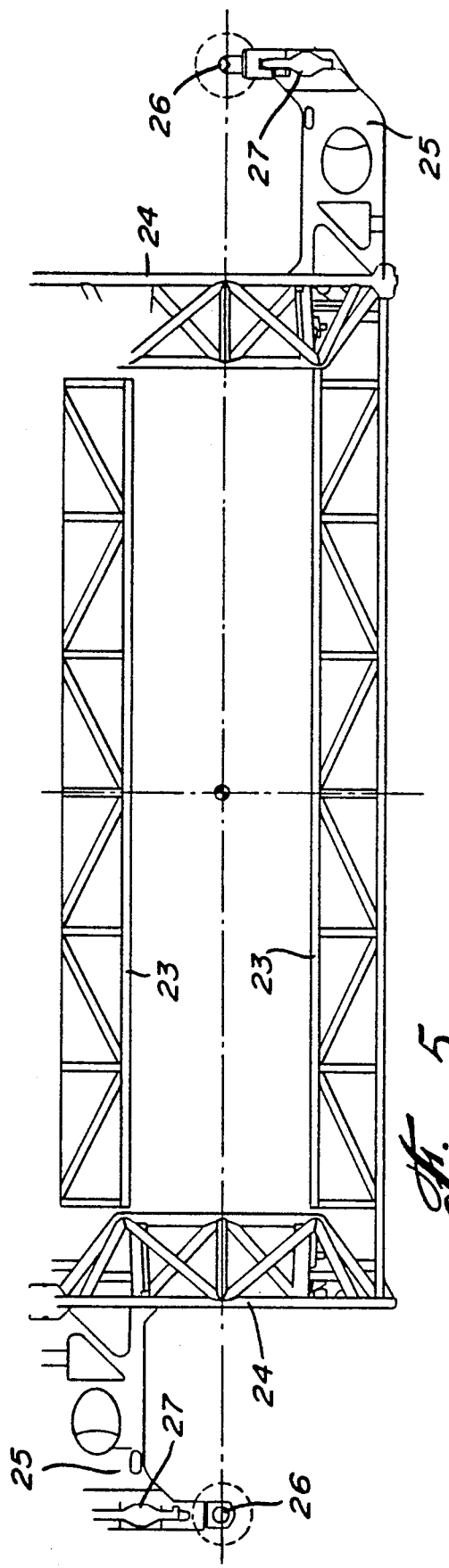
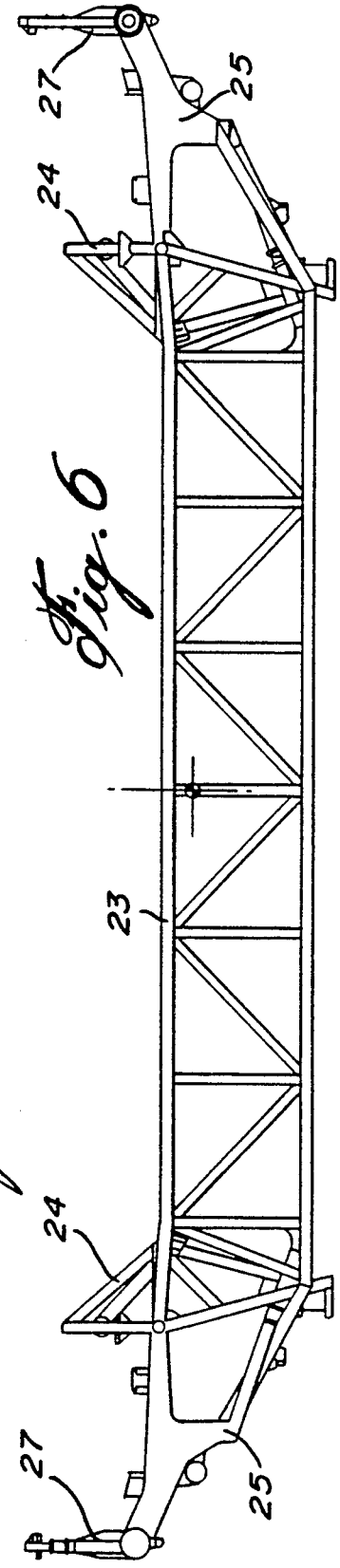

INTEGRATED CHASSIS AND SUSPENSION SYSTEMS FOR MONORAIL VEHICLES

BACKGROUND OF THE INVENTION

1 Field of the invention

The present invention relates to a light integrated chassis and suspension systems for vehicles, and particularly for monorail type vehicles. The suspension system located at each end of the chassis embraces a monobeam rail in order to support the vehicle for any expected riding loads.

2. Description of Prior Art

Up to now, supporting frames and suspension systems for vehicles of monorail trains are known in various designs equipped with wheels with or without wheel flanges, and furthermore equipped with pneumatic tires with or without tire treads (ex.: U.S. Pat. Nos. 3,143,977, 3,399,629 and 3,048,127; and Canadian patent nos. 603,065 and 787,668). Various constructions of such monorail vehicles combined with the principle used to connect the structure to a separated bogie lead to a heavy and sophisticated structure. Experience has shown that during operation, especially when passing through curves and switches, forces act upon the vehicle suspension which produce vibrations and thus cause discomfort to the passengers. Furthermore, in bogies for monorail vehicles, the spring movements of the carrying wheels, for example, those caused by unequalities of the running surface, move the side wheels vertically (transversely to their direction of runnings) and cause abrasion of the pneumatic tires. Consequently these tires wear more rapidly and are very expensive to replace.

The suspension system of the present invention carrying wheel moving on the top surface of the said monobeam rail. A shock absorbing system and an air bag levelling system which maintains constant the height of the floor of the vehicle above the running surface of the monobeam rail. Four side wheels located in the vicinity of the carrying wheel complete the suspension system. The side wheels serve the main function of taking up forces which tend to tilt the vehicle while helping the guidance of the vehicle on the monorail beam. The side wheels are equipped with shock absorbing and spring preloading systems. All of the running wheels are equipped with pneumatic tires and appropriate journal bearings and are integrated to the chassis of the monorail vehicle by means of mechanical systems providing simultaneously the required flexibility and/or rigidity to assure safe and smooth riding conditions to passengers for all expected riding loads.

The chassis extends from the end receiving the preceeding vehicle, through a pin connection mechanism, to the end receiving the next vehicle using a similar pin connection mechanism, and comprises the whole supporting frame between these two ends. The main feature of the chassis is to provide adequate attachment and support to the passenger shell, to the suspension system and to any equipment required for the operation of the vehicle. The weight distribution of the equipment and of the integrated chassis and suspension system, is such that the minimum overturning moment around the driving direction axis is maintained.

SUMMARY OF THE INVENTION

It is a feature of the present invention to provide an integrated chassis and suspension system which substantially overcomes one of the above outlined drawbacks of the prior art.

It is another feature of this invention to provide a light integrated chassis and suspension system, in the field of monorail vehicles, which will have improved running conditions compared to heretofore known systems of the type involved.

According to the above features, from a broad aspect, the present invention provides a monorail vehicle support system for supporting a vehicle body along a monobeam rail having top and side running surfaces. An attachment frame is secured to opposed ends of the vehicle chassis. A single steerable load carrying wheel is supported in a vertical plane by the attachment frame for support engagement with the top running surface of the rail. A pair of side wheels, having pneumatic tires, are supported spaced-apart in parallel horizontal planes below the carrying wheel and on one side thereof for frictional engagement with one of the side running surfaces of the rail. A levelling system is connected to coupling means secured to an axle of the carrying wheel and has adjustment and levelling means for maintaining the vehicle's chassis at a substantially constant level with respect to the rail by compensating for vertical displacement of the car body or car floor caused by the variations of the load.

BRIEF DESCRIPTION OF DRAWINGS:

These and other features and advantages of the invention will become apparent from the following description of a preferred embodiment illustrated by the accompanying drawings, in which:

FIG. 2 is a top view of the assembly of the chassis and suspension systems between two connected vehicles;

FIG. 3 is a side view of the assembly of the chassis and suspension systems between two connected vehicles;

FIG. 5 is a top view of the chassis of the vehicle according to the invention, and FIG. 6 is a side view of the chassis of the vehicle.

Figures 1, 4:
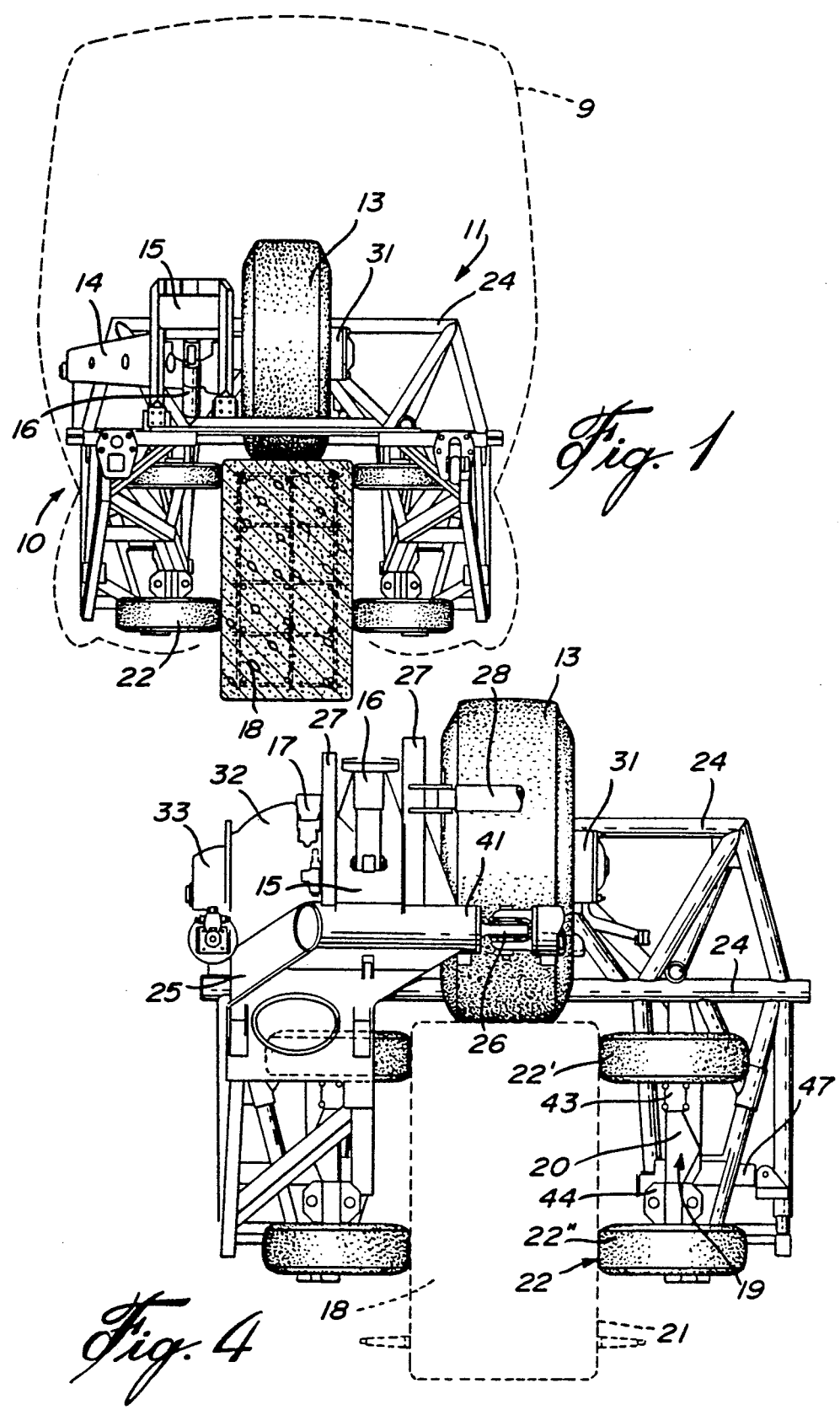
FIG. 1 is an end view of a monorail vehicle equipped with the support system of the present invention.
FIG. 4 is a section view taken along section line A—A of FIG. 3.

DESCRIPTION OF PREFERRED EMBODIMENTS:

Referring to FIG. 1, there is shown a monorail vehicle 9 equipped with the integrated chassis 10 of the present invention and its suspension system 11 for supporting the vehicle on a monobeam rail 18.

Referring now additionally to FIG. 2, there is shown two integrated chassis and their suspension systems 11 secured together at their opposed ends 10'. The chassis is of light construction and of sufficient length to support a passenger shell (not shown) and to receive the suspension systems as well as the equipment required for the operation of the vehicle. The location of the equipment is such that the net overturning moment around the driving direction axis 12 is of a minimum value.

Briefly, the present invention provides a suspension system 11 and its installation on the chassis with carrying wheels 13 located near the ends of the chassis and equipped with a steering system acted upon by a linkage mechanism which transmits the relative orientation of the two vehicles connecting at a specific end. The carrying wheel takes the vertical load as well as loads due to braking/accelerating conditions, and transmits those to a load arms 14 by means of a connecting axle equipped with a knuckle, as will be described in detail later.

One end of the load arm is pinned into the chassis while the other end, located in front of the carrying wheel 13 when looking into the driving direction (see FIG. 3) is attached to the bottom of an air bag system 15 fixed to the chassis by means of a supporting bracket, together with a shock absorber 16. A levelling valve system 17 acts upon the air bag system 15 in order to maintain a quasi-constant height of the floor of the vehicle (not shown) over the monobeam rail 18 during loading and unloading of the passengers and during vehicle operation by adjusting the inside pressure of the air bag. The means reading value of the distance between the load arm and the chassis of the two vehicles connecting at one end, as transmitted by the levelling cable system, is used to maintain constant the height of the chassis for both vehicles at this specific end. This carrying wheel air bag system could be seen as being two springs acting in series, one, the carrying wheel having a large stiffness and second, the air bag having a much smaller stiffness. The levelling system is designed to correct floor height whenever there is a variation due to a change in load. No pneumatic levelling system used so far will correct vertical move from dynamic effect because of the slow system response time and also because of the high air flow required. The usage of radial type tires helps to minimize the wear of the side tires since this type develops less transverse force than any other types in response to any vertical excursion of the chassis. Furthermore, a magnetic deflation sensor system connected to the carrying wheel warns the train driver in case of any tire pressure problem.

In this way, such an arrangement and systems provide smooth efficient and safe riding conditions to passengers and contributes to increase the tire life.

The present invention also provides an adjustable spring preloading system 19, acting upon the side suspension arm 20 to maintain securely the side suspension wheels 22 in contact with the lateral surface 21 of the monobeam rail 18. The suspension arm 20 is equipped with two side wheels 22, one being the upper guide wheel 22' moving on the upper range of the lateral surface of the monobeam rail, and second, the lower guide wheel 22", moving on the lower range of the lateral surface of the monobeam rail. Each suspension arm is pinned at two points in the chassis, by means of pins covered of resilient materials, and is further equipped with a shock absorber in order to provide smooth riding conditions even in passage through switches. The location of the side wheels 22 relative to the carrying wheels 13, as shown in FIG. 3, assures a highly satisfactory guiding of the vehicle over the monobeam rail. Such an arrangement and systems bring about a favorable transfer of the lateral forces between the vehicle and the monobeam rail 18 by means of side wheels 22 which providing smooth, efficient and safe riding conditions to passengers.

The carrying wheel 13 and the side wheels 22 are equipped with pneumatic tires, and emergency safety wheels are provided for all running wheels. The vertical safety wheel is made of aluminum in order to resist adequately to the vertical load and to prevent the crushing of the monobeam rail surface while the lateral safety wheels are made of a soft material such as polyurethane or rubber.

With the system of the present invention, the life of pneumatic tires is well improved compared to heretofore known similar designs since the carrying wheels 13 are steerable by means of an efficient driving mechanical system and since the distance between side wheels 22, from one end to the other end of the chassis, is such that a highly satisfactory guiding of the vehicle is obtained over the monobeam rail without straining the tires. The levelling valve system and the air bag device contribute to highly improved the life of the side tires as well as to provide a much better ride quality than any heretofore known designs.

Referring to the drawings in more detail, the complete chassis 10 shown therein is formed as a light welded structure which embraces the monobeam rail 18 and comprises primarily two side trusses 23 align along the monobeam rail, two end trusses 24 connecting the two side trusses 23 and two end hangers 25 interfacing with the two end trusses 24 and the two side trusses 23. Each end hanger 25 includes a spherical bearing 26 at the connecting point between vehicles and an air bag tower 27 supporting the air bag system 15. A shock absorber 28 is connected to the end hanger 25 of each vehicle, above their connecting point, and is provided in order to limit the rolling of the vehicles relative to each other when riding on the monobeam rail. The arrangement of trusses and end hangers provide a light but stiff structure meeting the objectives of the present invention.

The load carrying wheel 13, at each end of the vehicle frame, is equipped with a deflation sensor system mounted over a shaft and knuckle system 29 which is attached to a load arm 14. The latter is pinned at two points to the end, truss 24 through bearings and/or resilient material 30. The axle 31 of the carrying wheels 13 extends through the load arm 14 to a gear box 32 attached to the said load arm 14. A disc brake system 33 (disc and caliper) is mounted on the end of the carrying wheel axle 31 coming out of the said gear box 32. The gear box 32 receives a driving shaft 33 (see FIG. 2) from the propulsion motor 34. The shaft 33 is built in two parts in order to accommodate variations of distance between the load arm 14 and the end hanger 25 during operation. The motor 34 is attached to the end hanger 25 using bushing connection 35 and strut 36, both including resilient material in order to reduce vibrations transmitted to the chassis.

The camber of the carrying wheel 13 is adjustable through the pinning system 31 interfacing the load arm 14 with the end truss 23 while the toe is adjustable by means of the steering linkage system 37. As shown in FIG. 1, a steering linkage 37 is connected at each end of the vehicle chassis 10 and 10' and to the end hanger structure 25 of the opposite chassis to direct the carrying wheel 13 relative to the position of the end of the preceding vehicle during curve negotiation as is obvious in the art . These capabilities of camber and toe adjustments combined with the positive steering system of the carrying wheel better improve the tire life compared to any heretofore known designs in the field of this invention.

The load acting upon the carrying wheel 13 is transmitted to the load arm 14 through the axle and knuckle system 29. This load reacts at the two ends of the load arm since one end is pinned in the end truss 23 while the other end is attached to the bottom of an air bag 15. The ratio of load taken by each end may be adjusted by properly locating the point of attachment of the carrying wheel 13 on the load arm 14 as well as properly locating the air bag system 15 on the load arm 14. This capability allows to suit many configurations and applications of such vehicles and, thus, adds to the advantages of the present invention.

The air bag system comprises the air bag 15, the levelling valve 38 and two cables 39. The top of the air bag system is fixed to the chassis by means of a supporting bracket 40 while its bottom is mounted on the load arm 14, together with a vertical shock absorber 16. The levelling valve 17 acts upon the air bag 15 in order to maintain a quasi-constant height of the floor of the vehicle over the monobeam rail during loading and unloading of the passengers and during vehicle operation, by adjusting the inside pressure of the air bag. The mean reading value of the distance between the load arm 14 and the end hanger 25 of the two vehicles connecting at one end, as transmitted by the two cables 39, is used to maintain constant the height of the chassis for both vehicles at this specific end. As previously mentioned, this carrying wheel air bag arrangement could be seen as being two springs acting in series, first, the carrying wheel having a large stiffness and second, the air bag having a much smaller stiffness. During operation, any vertically dynamic effect will cause a small deflection of the carrying wheel 13 while inducing a much larger displacement of the load arm 14 at its connecting end with the air bag 15. The levelling valve system responds quickly to this impulse by adjusting the inside pressure of the air bag 15, thus, maintaining the previous height of the vehicles and avoiding side tires wearing.

For the purpose of minimizing the weight, the air reservoir 41, used to supply air to the air bag, is part of the end hanger structure 25. The air compressor (not shown) is mounted in the side truss 23. The location of all the equipment is such that the net overturning moment around the driving direction axis is negligible, contributing to the stability of the vehicle and to the non-wearing of the side tires.

The four side wheels 22, equipped with radial tires, are mounted on axles 42 by means of journal bearings. These axles are firmly gripped into jaws 43 and 44 mounted on the side suspension arm 20. At the opposite of jaw 43, jaw 44 offers the possibility to adjust, transversely to the monobeam rail. The position of the lower side wheel relative to the upper side wheel. This feature allows to control quite independently the preloading of the lower side wheel while the main preloading of the side wheels is achieved by means of the adjustable spring system 45 acting between the end truss 24 and the central part of the suspension arm 20. The latter is pinned at two points to the end truss 24 by means of resilient material 46. This and the shock absorber 47 installed between the side suspension arm and the end hanger 25, contribute to considerable reduction of vibrations transmitted to the chassis and coming from unequalities of the running surface and passages through switches and curves. The capability of this complete side suspension to resist to overturning moment due to wind and centrifugal effects, while providing a safe and smooth ride quality to passengers, is another advantage of the present invention.

Finally, emergency safety wheels are provided for all running wheels in order to protect the passengers whenever failed tires or other emergency conditions occur. The vertical safety wheel 50 is made of aluminum in order to resist adequately to the vertical load and to prevent the crushing of the monobeam rail surface while the lateral safety wheels 48 and 49 are made of a soft material such as polyurethane.

A further advantage of this invention is the complete uncoupling of the vertical and lateral movements of the vehicle bringing out a high level of ride quality. This latter being improved by the provided suspension: use of radial tires, uses of resilient material cushions, air bag system including levelling system, use of spring elements and use of shock absorbers as described above.

It is within the ambit of the present invention to cover any obvious modifications of the embodiment describes herein provided such modifications fall within the scope of the appended claims.

We claim:

1. A monorail vehicle support system for supporting a vehicle body along a monobeam rail having top and side running surfaces, said support system comprising an attachment frame secured to opposed ends of a vehicle chassis, a single steerable load carrying wheel supported in a vertical plane by said attachment frame for support engagement with said top running surface of said rail, a pair of side wheels having pneumatic tires and supported spaced apart in parallel horizontal planes below said carrying wheel and on one side thereof for frictional engagement with one of said side running surfaces of said rail, a load arm being secured at one end to said attachment frame and at an opposed end to one end of an axle of said carrying wheel, said load arm extending to one side of said load carrying wheel thereby to permit said load carrying wheel to be removed from the other end of said axle, said axle extending through said load arm through a gear box attached to said load arm and a brake system is secured to an extended end of said axle, a leveling means maintains said vehicle chassis at a substantially constant level with respect to said rail by compensating for vertical displacement of said axle caused by the variation of the load on said carrying wheel thereby maintaining said side wheels substantially fixed in their horizontal plane to minimize transverse friction wear of said pneumatic tires of said side wheels, and sensing means connected to said load arm for controlling said leveling means to displace said chassis to maintain same at said substantially constant level.

2. A monorail vehicle support system as claimed in claim 1 wherein said levelling means is a compressed air chamber device, said leveling means having a levelling valve system connected to said air chamber device and an air compressor means to adjust pressure inside said air chamber device to compensate for vertical displacement of said load carrying wheel.

3. A monorail vehicle support system as claimed in claim 2 wherein said air chamber is an air bag device, said air bag device having a top part fixed to said chassis by a supporting bracket, and a bottom part connected on said load arm together with a vertical shock absorber, said load arm being connected to said axle through a knuckle system, said vertical displacement of said axle at a connecting end of said load arm inducing a larger displacement of said load arm at its connection with said bottom part of said air bag device.

4. A monorail vehicle support system as claimed in claim 1 wherein said pair of wheels are interconnected by a side suspension arm to maintain said side wheels in contact with said side running surface of said rail, said suspension arm being connected to said attachment frame by resilient coupling means.

5. A monorail vehicle support system as claimed in claim 4 wherein a lower one of said side wheels is adjustably connected to said side suspension arm for independent transverse adjustment thereof relative to an upper one of said side wheels whereby to independently control the preloading of said lower side wheel independent also of the main preloading of said side suspension.

6. A monorail vehicle support system as claimed in claim 2 wherein there is further provided emergency safety wheels for each said load carrying wheel and said pair of side wheels, said safety wheels engaging said top and side running surfaces of said rail and providing protection against failure of said pneumatic tires.

7. A monorail vehicle support system as claimed in claim 2 wherein said chassis comprises two main side trusses aligned on a respective side of said rail, an end truss secured across opposed ends of said main trusses, said attachment frame being constituted by an end hanger secured to said end truss.

8. A monorail vehicle support system as claimed in claim 7 wherein said end hanger includes a spherical bearing to connect two of said chassis together, and a shock absorber connected to said end hanger above said connection to limit the rolling of said vehicle body relative to an adjacent interconnected vehicle body.

9. A monorail vehicle support system as claimed in claim 3 wherein said axle is a driving axle connected to a propulsion motor through a gear box, said axle being built in two parts within said gear box to accomodate variations in distance between said load arm and said attachment frame during operation.

10. A monorail vehicle support system as claimed in claim 2 wherein said load carrying wheel has a chamber which is adjustable through a pinning system interfacing said load arm with said attachment frame, said load carrying wheel also having an adjustable toe provided by means of a steering linkage system.

* * * * *